United States Patent [19]
Randall

[11] 4,383,293
[45] May 10, 1983

[54] ISOLATED DC CURRENT SENSE CIRCUIT

[75] Inventor: Ronald H. Randall, Cuba, N.Y.

[73] Assignee: Acme Electric Corporation, Cuba, N.Y.

[21] Appl. No.: 321,458

[22] Filed: Nov. 16, 1981

[51] Int. Cl.³ .......................................... H02M 3/335
[52] U.S. Cl. ........................................ 363/25; 363/97
[58] Field of Search ..................... 363/24, 25, 26, 27, 363/28, 37, 41, 96, 97

[56] References Cited

U.S. PATENT DOCUMENTS

| | | | |
|---|---|---|---|
| 3,824,441 | 7/1974 | Heyman et al. | 363/37 |
| 3,859,583 | 1/1975 | Reed | 363/26 |
| 4,055,790 | 10/1977 | Gerding et al. | 363/24 |
| 4,092,708 | 5/1978 | Gerding et al. | 363/97 X |
| 4,112,286 | 9/1978 | Alderman et al. | 363/96 X |
| 4,128,866 | 12/1978 | Doerre | 363/28 X |
| 4,301,498 | 11/1981 | Farrer | 363/25 |

*Primary Examiner*—William M. Shoop
*Attorney, Agent, or Firm*—Pearne, Gordon, Sessions, McCoy, Granger & Tilberry

[57] ABSTRACT

An inverter circuit is disclosed in which the alternating current output is rectified to become a DC power supply with a regulated output voltage. The inverter is controlled to limit the peak current conducted by the power semiconductors and a current limit circuit is provided to limit the DC output current. The invention provides an output current sensing circuit utilizing a current transformer, with the primary winding thereof connected in the alternating current portion of the inverter circuit and with current flow in the primary winding proportional to the DC output. Rectifier means is provided to rectify the output of the secondary winding of the current transformer, and this is supplied across a first resistor. There is means to sample the voltage across this first resistor only during the conduction period of the power semiconductors. An integrating means is provided to integrate the sampled voltage and develop an output current signal for control of the output current from the inverter circuit. The foregoing abstract is merely a resume of one general application, is not a complete discussion of all principles of operation or applications, and is not to be construed as a limitation on the scope of the claimed subject matter.

20 Claims, 5 Drawing Figures

ISOLATED DC CURRENT SENSE CIRCUIT

BACKGROUND OF THE INVENTION

In regulator circuits particularly, there have been many different systems devised for sensing the output current of a regulator having a DC output. U.S. Pat. No. 3,388,309, for example, shows a voltage regulator which has electrical conductivity isolation between the input and the output. U.S. Pat. No. 3,859,586 discloses a variable response peak detector circuit and U.S. Pat. No. 3,916,282 discloses a peak current detector. U.S. Pat. No. 3,764,881 is directed to a DC-to-DC converter which regulates the output voltage. An FET transistor is used to sample the voltage across the transformer primary winding and the transistor is gated on at a time just prior to the time that the transformer field collapses.

In many regulator applications (for example, a switching regulator is a type currently in favor), the regulator operates from commercial frequency and voltage conductors, for example, 230 volts and 60 Hertz, and it is desired to supply a low voltage/high current DC output. This might be used to power a computer or a computer terminal and the voltage output might be a low 5 to 15 volts DC, with the current at a high level, say 100 to 300 amperes. This makes large diameter conductors in the DC output circuit to carry this large amperage, and, in one prior circuit, a current transformer was connected in the low voltage AC output to the final DC rectifier; however, this required the current transformer to have a core sufficiently large to pass the single turn of the output lead through the center of this core. Even with a large transformer turns ratio reduction in the current from the current transformer, large sizes of diodes were required in the output circuit from this current transformer secondary. With circuits having high output currents, several problems arose, including the requirements for two costly current transformers with a large number of secondary turns, and, additionally, it became very difficult to pass the primary turn through the transformer core because of the large conductor size. Also in very large current units, multiple parallel diodes are required to carry the current, and in such case multiple current transformers must be used.

Another problem in the prior art circuit was to provide some means for detecting the peak current carried by the power semiconductors, either transistors or thyristors, so it had been previously known to utilize a current transformer and a diode bridge, with the primary winding of the current transformer connected in the primary winding circuit of the inverter to generate a peak current signal.

SUMMARY OF THE INVENTION

The problem to be solved, therefore, is how to satisfactorily and economically sense the output current of a converter circuit, especially where large DC output currents are involved. This problem is solved by an output current sensing circuit for a converter circuit converting between AC and DC and having at least one controllable power semiconductor with a converter control circuit connected to control the conduction time of the semiconductor, said output current sensing circuit comprising, in combination, a current transformer having primary and secondary windings, means connecting said primary winding in an alternating current portion of the converter circuit for current flow therethrough proportional to an output of the converter circuit, rectifier means connected to rectify the output of the secondary winding of said current transformer, a first resistor connected to the output of said rectifier means, means to sample the voltage across said first resistor only during the conduction periods of the power semiconductor, and means to integrate said sampled voltage to develop an output current signal proportional to the output current from the converter circuit.

This problem is further solved by an output current sensing circuit for a converter circuit converting between AC and DC and having at least one controllable power semiconductor with a converter control circuit connected to control the conduction time of the semiconductor, said output current sensing circuit comprising, in combination, a current transformer having primary and secondary windings, means connecting said primary winding in an alternating current portion of the converter circuit for current flow therethrough proportional to an output of the converter circuit, rectifier means connected to rectify the output of the secondary winding of said current transformer, a first resistor connected to the output of said rectifier means to develop thereacross a DC signal, a bidirectionally conductive control semiconductor having first and second main electrodes and a control electrode and connected to said first resistor, means connecting the output of said control semiconductor main electrodes through a load, a bias resistor connected to said control electrode, and means connecting said bias resistor to the converter circuit at a point responsive to the conduction of the at least one converter power semiconductor to develop a control bias for said control semiconductor to develop an output current signal across said load.

This problem is still further solved by a combined peak current detection and output current sensing circuit for a converter circuit having at least one controllable power semiconductor connected to conduct through the primary winding of a power transformer with a converter control circuit connected to control the conduction time of the power semiconductor, said detection and sensing circuit comprising, in combination, a current transformer having primary and secondary windings, means connecting said current transformer primary winding for current flow therethrough proportional to an output of said converter, rectifier means to rectify the output of the secondary winding of said current transformer, a first resistor connected to the output of said rectifier means to develop thereacross a peak current detection signal, means to sample the voltage across said first resistor only during the conduction periods of the at least one semiconductor and means to integrate said sampled voltage to develop a sensing signal proportional to an output current of the converter circuit.

Accordingly, an object of the invention is to provide an output current sensing circuit which will economically sense the value of large output currents.

Another object of the invention is to provide an output current sensing circuit which is isolated from the output load circuit.

Still another object of the invention is to provide a combined peak current detection and output current sensing circuit for a converter.

A further object of the invention is to provide an output current sensing circuit which has means to sample the voltage output from a rectifier and means to integrate the sampled voltage.

Other objects and a fuller understanding of the invention may be had by referring to the following description and claims, taken in conjunction with the accompanying drawing.

DESCRIPTION OF THE PREFERRED EMBODIMENTS

Figures 1, 2:
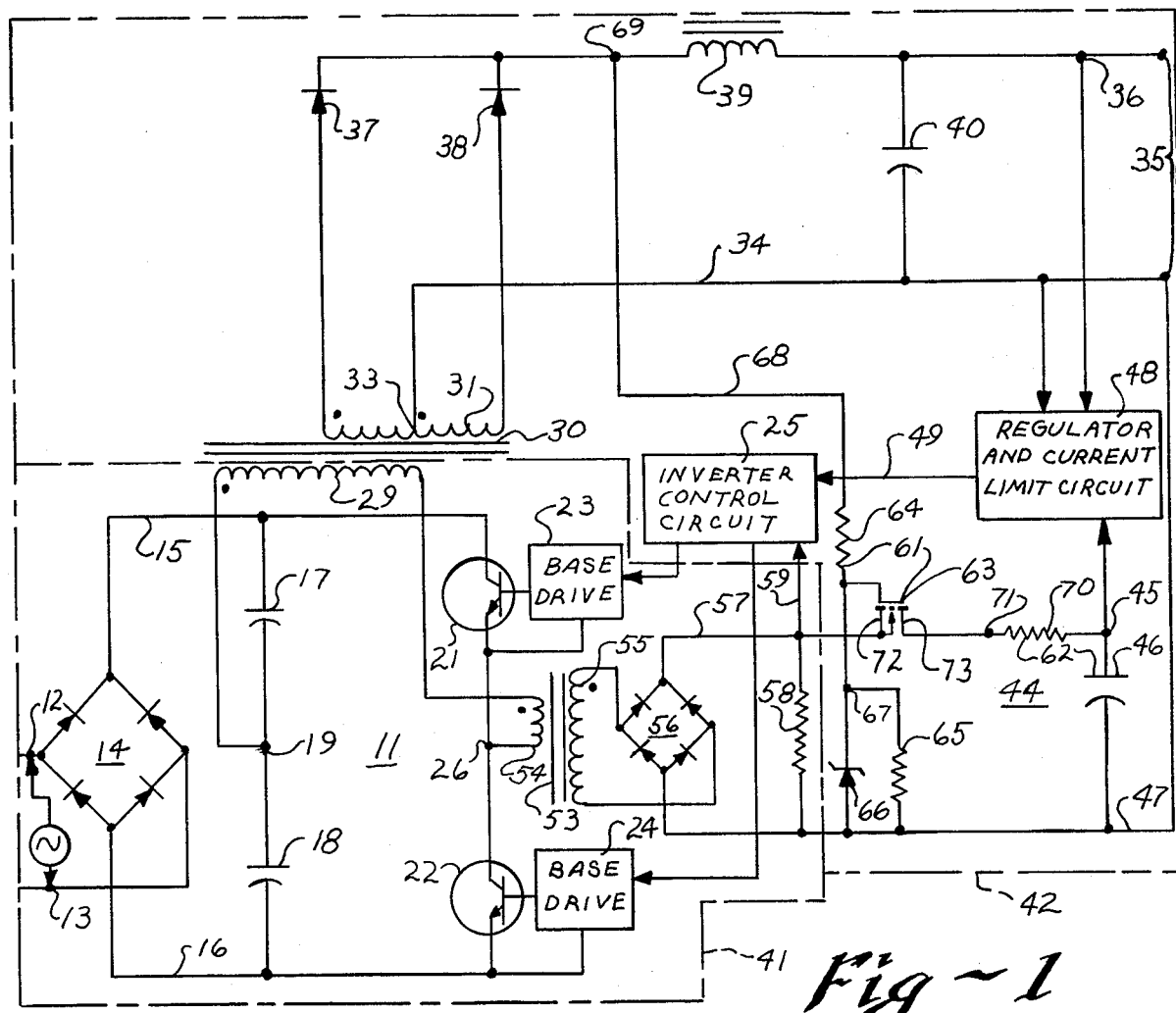
FIG. 1 is a schematic circuit diagram of a converter circuit incorporating the invention.
FIG. 2 is a schematic diagram of a modified current sensing circuit.

FIG. 1 illustrates a converter circuit 11 which is one example of a circuit converting between AC and DC. In this particular converter circuit 11 it includes an inverter circuit, inverting from DC to AC. This converter circuit 11 further is one which converts from AC to DC, from DC to AC, and then from AC to DC for a DC output. The converter circuit 11 may have an input from AC source terminals 12 and 13, which may be a source of commercial frequency and voltage, for example, 230 volts and 60 Hertz. Rectifier means 14 may be an uncontrolled rectifier of one of many different types in order to provide an unregulated DC voltage across positive and negative conductors 15 and 16. The rectifier means 14 as illustrated has a four-diode bridge, although, obviously, other rectifier means may be used, such as a single rectifier or a double rectifier and center tap transformer. Two capacitors 17 and 18 are interconnected at a center tap junction 19 and connected across the positive and negative conductors 15 and 16. At least one controllable power semiconductor is provided in the converter circuit 11 and in this instance of an inverter circuit, inverting from DC to AC, two such power semiconductors are shown as transistors 21 and 22. These are shown connected in series between the negative and positive conductors 15 and 16. Drive circuits 23 and 24 are connected to the power transistors 21 and 22, respectively, and are connected between the base and emitter of these transistors to control the conduction periods of such transistors. An inverter control circuit 25 may be one of many different control circuits, for example, Texas Instrument type TL 494, to establish a pulse width modulated inverter where the width of the pulse or percent of ON time relative to OFF time of the transistors is varied in order to control the output voltage of the converter circuit 11.

The load of the inverter 11 is connected between the center tap junction 19 and a center tap junction 26 which is between the two power transistors 21 and 22. This load in the particular circuit is shown as a primary winding 29 of a power transformer. The above-mentioned components are in a first portion 41 of the converter circuit 11. A second portion 42 of this converter circuit includes the components connected to the secondary winding 31 of this power transformer 30. The secondary winding 31 has a center tap 33 connected to a negative output line 34 of a first output 35. This first output might be 5 volts at 300 amperes, for example, and the inverter transistors 21 and 22 could be operating at 20 kilohertz, for example, in order to utilize a power transformer 30 which has a small core size. The secondary winding 31 is connected through some rectifier means to supply a positive output terminal 36 of the first output 35. This rectifier means is shown in FIG. 1 as diodes 37 and 38, a series inductance 39, and a parallel capacitor 40.

The output current on that first output 35 is sensed by an output current sensing circuit 44. This circuit has a sensing terminal 45 which is, in the circuit of FIG. 1, the voltage across the capacitor 46 relative to a ground line 47. This sensing terminal 45 is connected to a regulator and current limit circuit 48. This regulator portion of the circuit may regulate the torque of a DC motor connected to the first output 35; for example, it might regulate a constant current from this output, but, as shown, is a voltage regulator and, accordingly, is connected across the positive and negative terminals 36 and 34 of this first output 35. This regulator circuit may be one of many commercially available regulator circuits, and incorporates a current limit circuit to limit the maximum DC output current of this first output 35. This is done from the current sensing terminal 45. The regulator 48 is connected by a conductor 49 to the inverter control circuit 25 to control the ON times or conduction times of transistors 21 and 22, namely, the duty cycle of these transistors, and hence regulate the average output of this first output 35.

The output current sensing circuit 44 has an input from a current transformer 53, which has a primary winding 54 thereon connected in series with the primary winding 29 of the power transformer 30. The current transformer 53 has a secondary winding 55 connected through rectifier means 56 to a positive conductor 57 and the negative conductor 47. A first resistor 58 is connected as a resistive load for this rectifier means 56. The voltage across this first resistor 58 is a peak current detection circuit to detect the peak current conducted by the power transistors 21 and 22. This peak current signal is transmitted on a conductor 59 to the inverter control circuit 25 to protect these transistors by limiting such peak current. The output current sensing circuit 44 includes a sampling means 61 and an integrating means 62. The sampling means 61 includes an FET transistor 63, as well as biasing means, which includes resistors 64 and 65 and a Zener diode 66. The two resistors 64 and 65 are interconnected at a junction 67, with resistor 64 connected by a conductor 68 to a junction 69 between the cathodes of the diodes 37 and 38 and the series inductance 39. The junction 67 is connected to the gate of the FET transistor, and the source 72 and drain 73 of this transistor 63 are connected in series between the positive conductor 57 and the integrating means 62. This integrating means includes a resistor 70 and the sensing circuit capacitor 46. The FET transistor 63 may be more than a junction transistor, for example, a power FET transistor has been used, namely a Siliconix VN 10KM.

OPERATION

Assuming that the AC source terminals 12 and 13 are energized, the rectifier means 14 provides a DC voltage on the positive and negative conductors 15 and 16 which might be 325 volts DC, for example, The inverter circuit constituted by the transistors 21 and 22 might operate at 20 kilohertz, for example, operating as a pulse width modulated inverter, with the pulse width or duty cycle regulated by the regulator circuit 48 to regulate a current or voltage of the first output 35. For example, this might be 5 volts at 300 amperes maximum, with a variable current load at this output. The regulator 48 is connected to control the inverter control circuit 25 which controls the conduction times of the power transistors 21 and 22. The current transformer 53 may have a ferrite core so that it has a low residual flux. This transformer might have a 200:1 ratio between the secondary and primary windings, so that a DC voltage, for example 10 volts, is established between the positive and negative conductors 57 and 47. This would be a maximum voltage and the voltage would appear across the peak current detection circuit 58. This voltage is supplied by a conductor 59 to the inverter control circuit 25 to limit the peak current conducted by the transistors 21 and 22, hence protecting them from overcurrent and premature failure.

Figure 5:
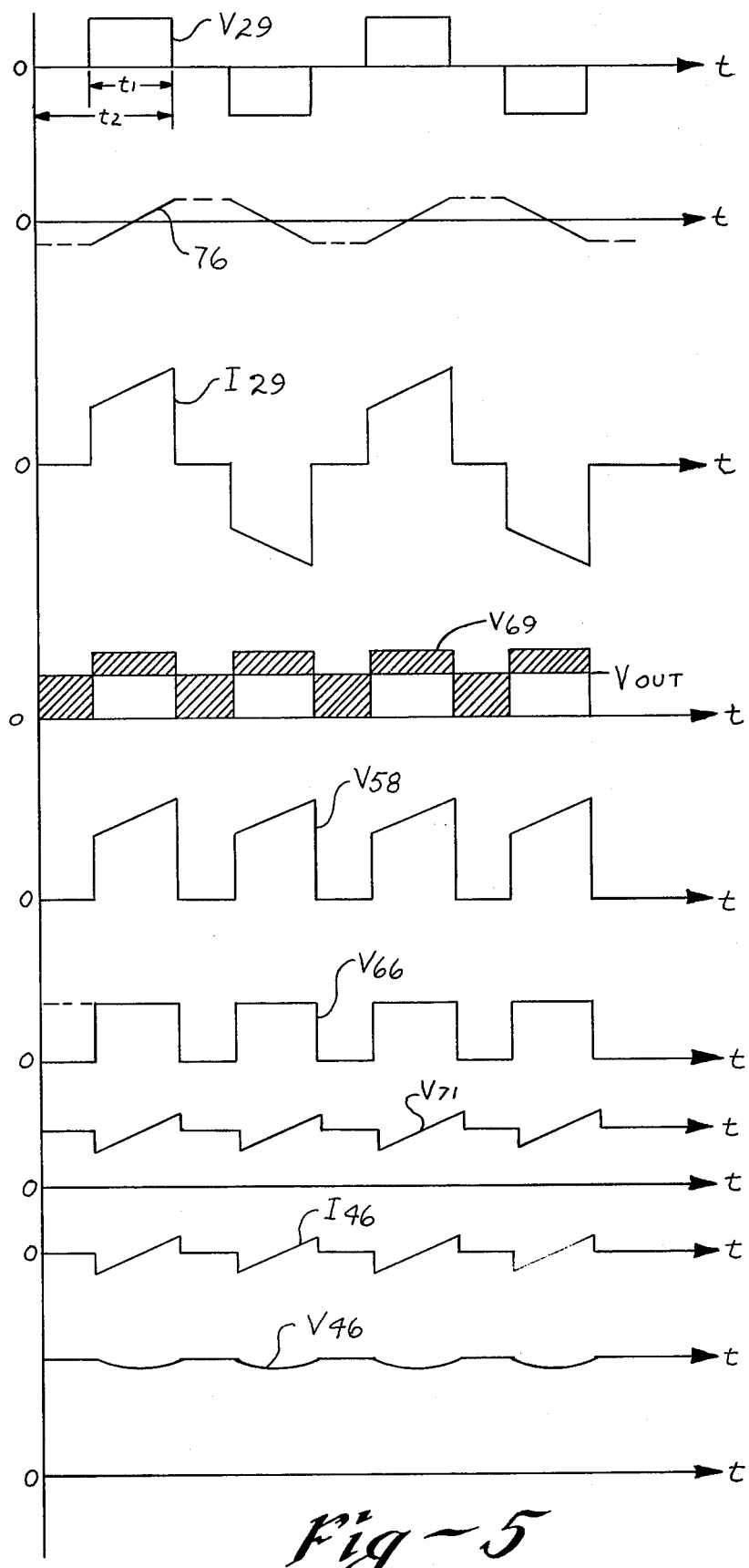
FIG. 5 is a plot of several waveforms to help explain the invention.

FIG. 5 shows the voltage waveform $V_{29}$ on the primary winding 29. The ON time or conduction time of each transistor is shown by time $t_1$ and a half of the entire period is shown by time $t_2$. Thus, the duty cycle is in the ratio of $t_1$ over $t_2$. An exciting current waveform 76 is shown in FIG. 5 and this is the exciting current as a function of time for this power transformer 30. The solid-line portion of this waveform 76 would add to and subtract from the power transistor current during the conduction time, and the dotted-line portion of this current waveform appears as difference ampere turns in the secondary winding 31 during the transistor OFF time.

FIG. 5 also shows a current waveform $I_{29}$ which is the current in the primary winding 29 of the transformer. The current in the secondary winding 31 would be similar, increased by the turns ratio. The sloping top to this current waveform is caused by the exciting current waveform 76. The ripple current in the output inductor 39 may be referred to as $\Delta I_{39}$.

$$\Delta I_{39} = \frac{V_{36}(t_2 - t_1)}{L_{39}} = \frac{V_{36}t_2(1 - M)}{L_{39}} = \frac{V_{36}(1 - M)}{2fL_{39}} \quad (1)$$

where $t_2 = 1/2f$, f = inverter frequency and M = the duty factor of $t_1/t_2$.

Since $V_{36} = MV_{69}$ for continuous current through inductor 39, $$\Delta I_{39} = \frac{V_{69} \times M(1 - M)}{2fL_{39}} = \frac{V_{69}(M - M^2)}{2fL_{39}} \quad (2)$$

Curve $V_{69}$ of FIG. 5 shows the voltage waveform of junction 69, which is the rectified output of the transformer secondary winding 31, before filtering.

From equation (2), it will be seen that for a fixed value of $V_{69}$, the maximum $\Delta I_{39}$ would occur at M = 0.5.

The change in current on the transistors 21 and 22, due to the ripple current through inductor 39, would be proportional to the transformer turns ratio:

$$\Delta I_{21} = \Delta I_{39} \frac{N_2}{N_1} \quad (3)$$

where $N_1$ is the number of turns on the primary winding 29, and $N_2$ is the number of turns on each half of the secondary winding 31.

Referring again to the current waveform $I_{29}$ of the current in the primary winding 29, one will note the sloping top on the waveform, due to the exciting current in the transformer, and due to the current through the filter inductor 39. The peak current detector includes the current transformer 55, the rectifier means 56, and the first resistor 58, and is used to protect the transistors 21 and 22 from any excessive peak currents. The voltage across the peak current detector resistor 58 is shown by the curve $V_{58}$ in FIG. 5. This peak current signal, as a voltage, is supplied on the conductor 59 to the inverter control circuit 25, which limits the peak current to a value safe for the transistors 21 and 22.

The present invention utilizes the current flow in the primary winding 29 to develop an output current sensing signal of the output current from output 35. To this end, the current transformer 53 and rectifier means 56, as well as the first resistor 58, perform a dual function. Each time the transistor 21 conducts, the diode 38 also conducts substantially simultaneously, and similarly, diode 37 conducts substantially simultaneously with transistor 22, and thus the voltage at junction 69 is developed, as shown in curve $V_{69}$ of FIG. 5. This voltage is used to bias on the sampling means 61, which includes the FET transistor 63. This voltage is limited by the Zener diode 66, and the voltage waveform $V_{66}$ is shown in FIG. 5. Sufficient voltage, for example 3–3.5 volts, is developed across the resistor 65 to bias the gate of the FET positive relative to the source 72 so that this FET will conduct. The voltage at junction 71 at the output of this FET is shown by curve $V_{71}$ in FIG. 5. This sampling means 61 samples the voltage only during the conduction times of the transistors 21 and 22. If one refers to the voltage curve $V_{58}$ in FIG. 5, which is the voltage across the peak current detector resistor 58, one will observe that the average of this signal is proportional to the output current at output 35. However, such average would also vary with the transistor conduction time or $$V_{average} = I_{35} \left( \frac{N_2}{N_1} \right) \left( \frac{N_3}{N_4} \right) MR_{58}.$$

Since the duty factor M varies as a function of the load current, line voltage, and output voltage, the average of this signal would not be acceptable for sensing the output current.

The present invention utilizes the sampling means 61 and the integrating means 62 to utilize this voltage across the peak current detector resistor 58 and achieve an output current sensing of the current in output 35. The FET 63 is conducting only during the conduction periods of the transistors 21 and 22. This voltage is applied to the series combination of resistor 70 and capacitor 46, and this RC circuit performs an integrating function. The position of the capacitor 46 and resistor 70 may be interchanged insofar as the integrating function is concerned, but with the capacitor 46 being the one connected to the ground line 47, an additional advantage is achieved, namely both the peak current detection signal across resistor 58 and the output current sensing signal across capacitor 46, are connected to the ground line 47. This permits simplification of the utilization of these signals by the regulator 48 and inverter control circuit 25. In FIG. 5 the current flow through the capacitor 46 is shown by the curve $I_{46}$ and the voltage across this capacitor 46 is shown by the curve $V_{46}$. The FET transistor 63 has the property of bilateral or bidirectional conduction, and by observing the curve $I_{46}$, it will be noted that it is a requirement for the transistor to have this bidirectional current flow. At the beginning of the portion of the conduction of the FET 63, current will flow out of the capacitor 46 and back through the FET into the first resistor 58. It is only during the latter portion of the conduction of the FET 63 that conduction is in the forward direction from the first resistor 58 to charge the capacitor 46. The curve $V_{46}$ shows the effects of this and the ripple voltage on the capacitor 46 is small to supply a good output current sensing signal to the regulator 48. This signal is used as a current limit signal to limit the current to avoid overloading the entire converter 11. If the FET 63 is a VMOS FET with an inherent parasitic diode anode at the source, and the cathode at the drain electrode, this parasitic diode should not affect circuit performance, since it will be back-biased during circuit nonconduction time.

FIG. 2 illustrates a modification of the invention, wherein a converter circuit 81 is shown. Referring to the circuit of FIG. 1, it will be noted that this circuit is shown as including the first portion 41 and the second portion 42. Only the second portion 42A is shown in the drawing of FIG. 2. The first portion 41 is not repeated, but may be used with the second portion 42A of FIG. 2. Those circuit components which have counterparts in FIG. 1 have been shown with the same reference numerals in FIG. 2. A second secondary winding 32 is shown on the main power transformer 30 in addition to the first secondary winding 31. This secondary winding 32 is connected through diodes 83 and 84 to a series inductor 85, and then to a regulator input terminal 86 of a three-terminal regulator 87. The secondary winding 32 has a center tap connected to a negative conductor 88 which is connected to the common terminal 89 of this regulator 87. The regulator 87 has an output terminal 90 and the terminals 89 and 90 form a second output 91 of the converter 11. A filter capacitor 92 is connected across the regulator input terminals.

The first secondary winding 31 again supplies the first output 35, but in this case an output current circuit 93 is incorporated in this second portion 42A, and it includes another current transformer 94, which has first and second primary windings 95 and 96, one each in series with the diodes 37 and 38. A secondary winding 97 acts through rectifier means 98 to supply a positive DC voltage on a conductor 99 relative to a negative conductor 100. This rectified voltage is applied to the series combination of a bias resistor 101 and a DC load resistor 102. A Zener diode 103 is connected in parallel wih the bias resistor 101 to limit the bias supplied by the resistor 101 between the gate and source of the FET transistor 63. As in the circuit of FIG. 1, this FET supplies current to the resistor-capacitor combination 70, 46.

In operation, the circuit of FIG. 2 is similar to that of FIG. 1. The biasing means 101, 103 for the FET will turn on this FET transistor 63 whenever the diodes 38 and 37 conduct, which will be substantially simultaneously with the conduction of the transistors 21 and 22 (see FIG. 1). In this case, the gating of the FET transistor 63 is self-driven by the current transformer 94. The pulsing DC bias voltage across the resistor 102 will be similar to the voltage curve $V_{58}$ of FIG. 5 and the voltage across the bias resistor 101 will be similar to the voltage curve $V_{66}$ of FIG. 5. Again, the current transformer 94, rectifier means 98, and FET transistor 63 act as sampling means to sample a dependent on load current voltage, in this case in the secondary winding 31 circuit of the converter 81, but still in an alternating voltage portion of this converter circuit. The integrating means, which includes the resistor 70 and capacitor 46, integrates this sloping top waveform, similar to the voltage waveform $V_{58}$ of FIG. 5, only during the conduction time of the transistors 21 and 22 to thus develop an output current sensing signal which is proportional to the output current of output 35. This output sensing signal has a low ripple, and is similar to the voltage curve $V_{46}$ of FIG. 5. It may be used as an overcurrent sensing signal to current limit the output 35. The current transformer 53 shown in the first portion 41 of FIG. 1 will then provide a fast primary current limit across the resistor 58 for protection of the transistors 21 and 22. The output current sensing circuit of FIG. 2, which is obtained across the capacitor 46, may be duplicated in the circuit for the second output 91, or it may be omitted where this second output is a smaller wattage output relative to the output 35 and rely only on the post regulator 87. The circuit of FIG. 2 includes a switch 106 which is a multiple pole, double-throw switch. With the switch in the position shown, the rectifier means 98 is a bridge rectifier utilizing four diodes. If the switch 106 is thrown to the opposite position, the rectifier means 98 becomes a simple half-wave rectifier utilizing only the diode 107. Normally, the circuit of FIG. 2 would not be provided with such a switch; this merely illustrates that the rectifier means may be either a full-wave or half-wave rectifier as examples of many different types of rectifier means to supply the pulsating DC voltage across the load resistor 102.

Figure 3:
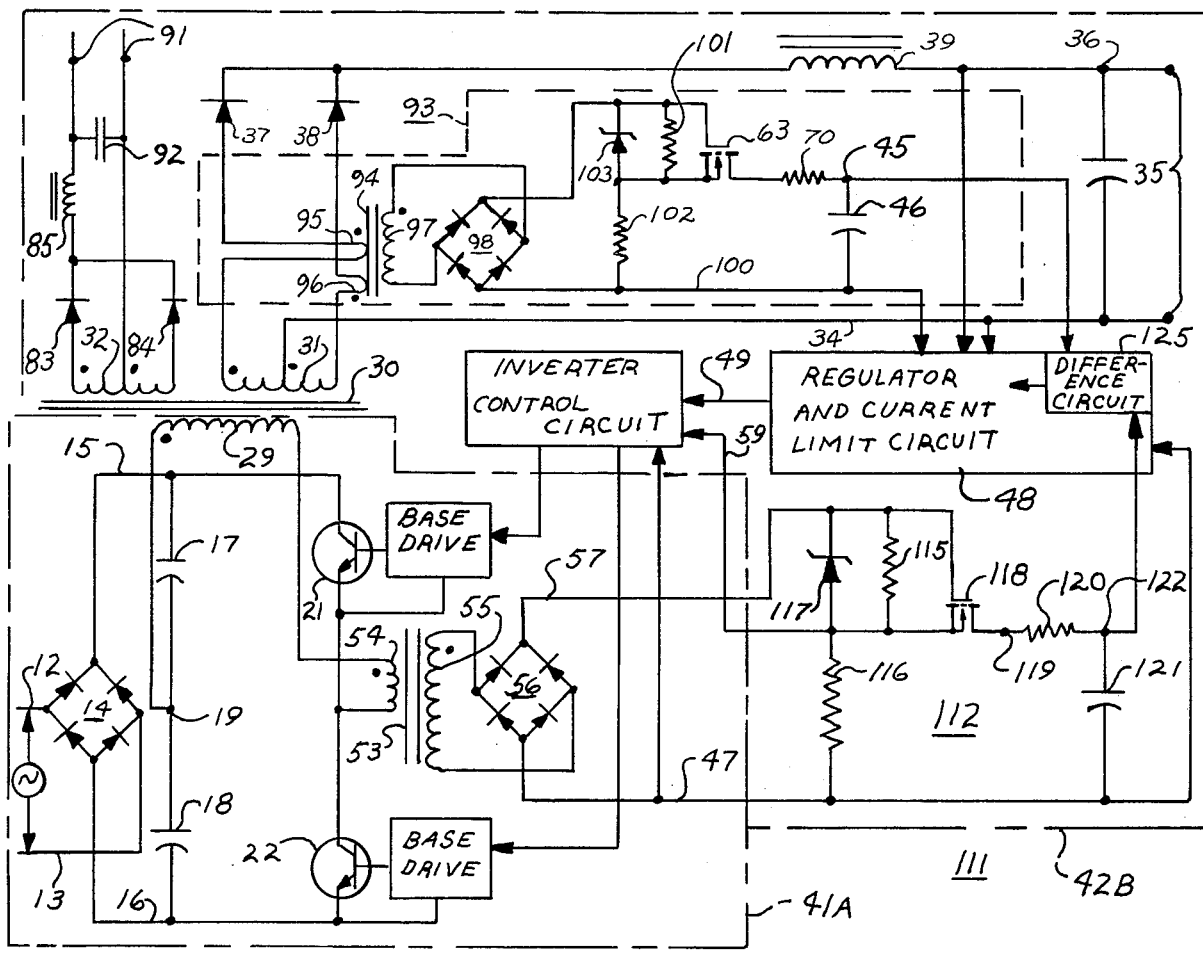
FIG. 3 is a schematic diagram of another modification of the invention.

FIG. 3 illustrates a further embodiment of the invention, disclosing a converter circuit 111 having a first portion 41A and a second portion 42B. The first portion 41A may be the same as the first portion 41 of FIG. 1 except for the omission of the first resistor 58 directly across the rectifier means 56. The output current circuit 93 of FIG. 2 is again used in the circuit of FIG. 3 on the output of the secondary winding 31. This again senses the output current on the output 35.

The second portion 42B differs from that shown in FIG. 2 by the addition of the output current sensing circuit 112 connected to the current transformer 53. This output current sensing circuit is similar to the circuit 93, and includes a biasing resistor 115 in series with a DC load resistor 116. A Zener diode 117 is connected in parallel with the biasing resistor 115. The series combination of resistors 115 and 116 are connected across the positive and negative conductors 57 and 47 from the rectifier means 56. The bias resistor 115 and Zener diode 117 provide bias for an FET transistor 118, and this portion of the circuit acts as a sampling means to sample the voltage across the resistors 115 and 116, which is proportional to the current through the primary winding 29 of the converter circuit 111. This sampling means samples this voltage only during the time that the transistors 21 and 22 are conducting in order to properly establish the output current sensing. Conduction of the transistor 118 is passed through a junction 119 to a resistor 120 and capacitor 121. A terminal 122 at the junction of the resistor 120 and capacitor 121 is the terminal at which the output current sensing voltage is developed, namely the voltage across the capacitor 121. This voltage is applied to the regulator 48. As shown in FIG. 3, this voltage may be applied to a difference circuit 125 and this difference circuit may also receive an input from the sensing terminal 45 of the output current sensing circuit 93.

The output current sensing circuit 112 operates in essentially the same manner as the output current sensing circuit 44 of FIG. 1. The bias means 115, 117 turns on the transistor 118 whenever the transistors 21 or 22 are conducting; hence, this is a sampling of the AC portion of the current through the converter circuit 111. This sampled voltage is supplied to the integrating means 120, 121 and the voltage across the capacitor 121 is similar to the voltage $V_{46}$ of FIG. 5. This is a signal proportional to the entire output current of the converter 111, including outputs 35 and 91. The output current sensing circuit 93 of FIG. 3 senses the current proportional to the output 35 alone and, therefore, when these two signals are supplied to the difference circuit 125, a sensing signal proportional to the output current of output 91 is supplied. By this means, current limiting of the entire converter circuit 11 may be achieved no matter whether it is the output 35 or the output 91 which is tending toward an overcurrent condition.

Figure 4:
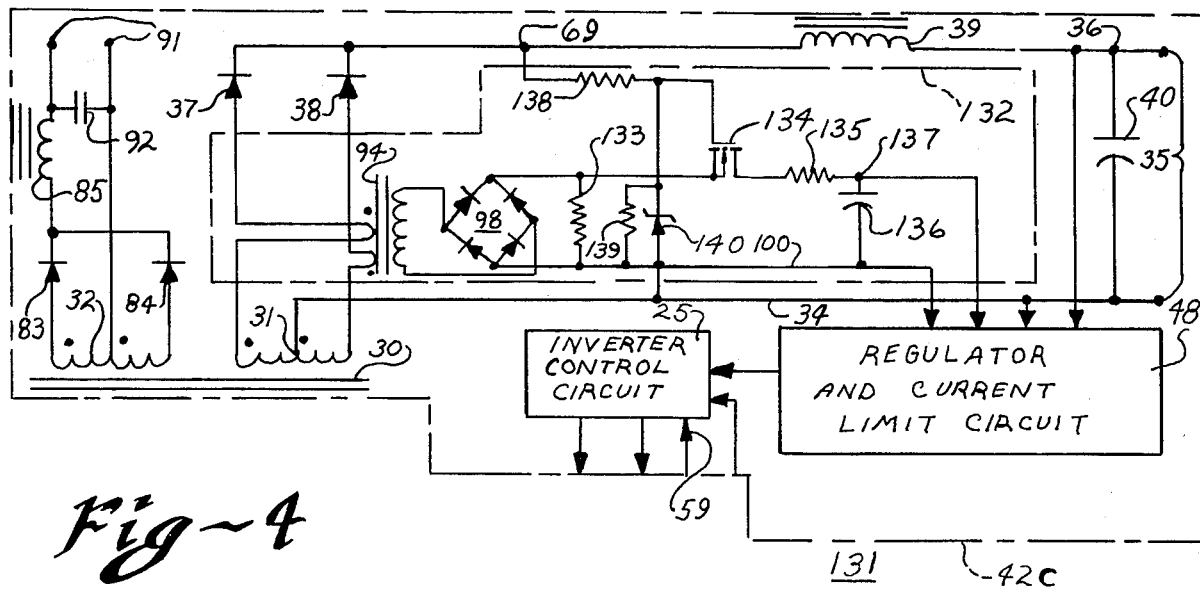
FIG. 4 is a schematic diagram of a further modification.

FIG. 4 shows a further embodiment of the invention in a converter circuit 131. This circuit may utilize the first portion 41 of FIG. 1 and shows a second portion 42C. This second portion 42C of the converter circuit 131 includes an output current sensing circuit 132 which is similar to the output current sensing circuit 44 of FIG. 1. In this current 132, however, it is connected to the output of the secondary winding 31. The current transformer 94 and the rectifier means 98 are utilized. This supplies a rectified signal to the DC load resistor 133. This signal is applied through the FET transistor 134 to a resistor 135 and capacitor 136. The junction between the resistor and capacitor is a sensing terminal 137 at which a voltage representative of the output current sensing circuit is obtained and applied to the regulator 48. The biasing for the FET transistor 134 is supplied by a resistor 138 in series with a resistor 139 between the terminal 69 and the negative conductor 34. A Zener diode 140 is connected in parallel with the resistor 139 for limiting the bias applied to the FET transistor 134. This output current sensing signal across the capacitor 136 will be proportional to the output current of the output 35 in a manner similar to the operation of the circuit of FIG. 2. The voltage rating of the Zener diode 140 will be high enough so that the gate-to-source voltage of the FET transistor 134 cannot be driven in excess of rating of that transistor. In many low voltage applications where a maximum voltage across the terminal 69 and negative connector 34 is less than 15 volts, then Zener diode 140 and resistor 139 may be eliminated.

In all these circuits of FIGS. 1, 2, 3, and 4, the biasing circuit is such that when the power transistor current from transistor 21 and 22 drops to zero, i.e., the transformer primary winding current is zero, then the biasing resistor will bias off the FET transistor, thus disconnecting the RC circuit 70, 46 from the first resistor 58 (see FIG. 1). In this way, the voltage across this first resistor 58 is sampled only during the conduction periods of the transistors 21 and 22.

The circuits of FIGS. 2 and 3 provide an isolated current signal proportional to the DC output current and may be used to control the output current, for example, in a current limit circuit, as a part of the regulator 48. In the circuits of FIGS. 1 and 3, there is a dual function in that the current transformer 55, rectifier means 56, and first resistor 58 supply two functions. The first function is a peak current limiting circuit to limit the peak current of the transistors 21 and 22. The second function is to be a voltage supply for the output current sensing circuit 44. This reduces the component count and volume because the current transformer 55, rectifier means 56, and resistor 58 perform a dual function.

The converter circuits 11, 81, 111, and 131 are circuits which convert between alternating current and direct current, and have at least one controllable power semiconductor 21 and 22. If the converter circuit is one which converts from DC to AC, as shown in the drawings, then two such controllable power semiconductors are used. If the converter circuit is one which converts from AC to DC, then in many cases only a single controllable power semiconductor need be used. It will be noted that in each of these circuits of FIGS. 1 through 4, the current transformer 55 and 94 are connected in an alternating current portion of the converter circuit and that there is current flow through the windings of the current transformer which is proportional to an output of the converter circuit. Rectifier means 56 and 98 are provided to rectify the output of the secondary winding of such current transformer, with the output from the rectifier means supplied to the first resistor 58, 102, 116 or 133. The voltage across this first resistor is sampled by the sampling means only during the conduction period of the power semiconductors and this sampling means includes the FET transistor 63, 118 or 134. These are control semiconductors which are bidirectionally conductive, and from the current waveform $I_{46}$ of FIG. 5, it will be noted that the control semiconductor sometimes conducts in a forward direction and at other times in a reverse direction.

It will be noted that the circuits show various means for biasing the sampling means, which includes the FET transistor 63, 118, or 134 into conduction substantially simultaneously with conduction of the at least one power semiconductor 21 and 22. In FIGS. 2 and 3, the biasing means 101, 103 derives its energy from the current transformer 94 because the biasing resistor 101 is connected to this transformer. In FIGS. 1 and 4, the biasing means 61 and 138 obtain their energy from the first output 35, namely at terminal 69. These circuits of FIGS. 1 and 4 thus have the advantage of reduced burden on the current transformer 94. It will be noted, however, that in the circuits of FIGS. 1 and 4 the output current sensing circuit is electrically connected to the output circuit rather than being isolated, as in the circuits of FIGS. 2 and 3.

The field effect transistors 63, 118, and 134 are control semiconductors which have first and second main electrodes and a control electrode. In this embodiment of using the field effect transistor, the source and drain are the main electrodes and the gate is the control electrode. The main electrodes are connected through a load and the load is the integrating means, namely, the resistor 70 and capacitor 46, in FIG. 1.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. An output current sensing circuit for a converter circuit converting between AC and DC and having at least one controllable power semiconductor with a converter control circuit connected to control the conduction time of the semiconductor, said output current sensing circuit comprising, in combination:
   a current transformer having primary and secondary windings;
   means connecting said primary winding in an alternating current portion of the converter circuit for current flow therethrough proportional to an output of the converter circuit;
   rectifier means connected to rectify the output of the secondary winding of said current transformer;
   a first resistor connected to the output of said rectifier means;
   means to sample the voltage across said first resistor only during the conduction periods of the power semiconductor; and
   means to integrate said sampled voltage to develop an output current signal proportional to the output current from the converter circuit.

2. An output current sensing circuit as set forth in claim 1, wherein said sampling means includes a bidirectionally conducting control semiconductor.

3. An output current sensing circuit as set forth in claim 1, wherein said sampling means includes bias means biasing said control semiconductor into conduction substantially simultaneously with conduction of the power semiconductor of the converter circuit.

4. An output current sensing circuit as set forth in claim 1, wherein said integrating means includes capacitive means.

5. An output current sensing circuit as set forth in claim 1, wherein said sampling means includes an FET transistor connected to said first resistor, and biasing means connected to cause conduction of said transistor substantially simultaneously with the at least one power semiconductor.

6. An output current sensing circuit as set forth in claim 5, wherein said integrating means includes a second resistor and a capacitor connected for current flow therethrough concurrently with conduction of said transistor.

7. An output current sensing circuit for a converter circuit converting between AC and DC and having at least one controllable power semiconductor with a converter control circuit connected to control the conduction time of the semiconductor, said output current sensing circuit comprising, in combination:
   a current transformer having primary and secondary windings;
   means connecting said primary winding in an alternating current portion of the converter circuit for current flow therethrough proportional to an output of the converter circuit;
   rectifier means connected to rectify the output of the secondary winding of said current transformer;
   a first resistor connected to the output of said rectifier means to develop thereacross a DC signal;
   a bidirectionally conductive control semiconductor having first and second main electrodes and a control electrode and connected to said first resistor;
   means connecting the output of said control semiconductor main electrodes through a load;
   a bias resistor connected to said control electrode; and
   means connecting said bias resistor to the converter circuit at a point responsive to the conduction of the at least one converter power semiconductor to develop a control bias for said control semiconductor to develop an output current signal across said load.

8. An output current sensing circuit as set forth in claim 1, wherein said control semiconductor is a field effect transistor.

9. An output current sensing circuit as set forth in claim 7, including a Zener diode connected to said bias resistor to limit the bias voltage applied to said control semiconductor.

10. An output current sensing circuit as set forth in claim 7, wherein said bias resistor is connected to said first resistor.

11. An output current sensing circuit as set forth in claim 7, wherein said bias resistor is connected to the secondary winding side of the power transformer.

12. An output current sensing circuit as set forth in claim 7, wherein said power transformer has a secondary winding and said current transformer winding is connected in series with said power transformer secondary winding.

13. An output current sensing circuit as set forth in claim 7, wherein said load includes a second resistor and a capacitor.

14. An output current sensing circuit as set forth in claim 13, wherein said first resistor and said capacitor are connected to a common conductor.

15. A combined peak current detection and output current sensing circuit for a converter circuit having at least one controllable power semiconductor connected to conduct through the primary winding of a power transformer with a converter control circuit connected to control the conduction time of the power semiconductor, said detection and sensing circuit comprising, in combination:
   a current transformer having primary and secondary windings;
   means connecting said current transformer primary winding for current flow therethrough proportional to an output of said converter;
   rectifier means to rectify the output of the secondary winding of said current transformer;
   a first resistor connected to the output of said rectifier means to develop thereacross a peak current detection signal;
   means to sample the voltage across said first resistor only during the conduction periods of the at least one semiconductor; and
   means to integrate said sampled voltage to develop a sensing signal proportional to an output current of the converter circuit.

16. A combined detection and sensing circuit as set forth in claim 15, wherein said primary windings are connected in series.

17. A combined detection and sensing circuit as set forth in claim 15, including means connecting said peak current detection signal to the converter control circuit to control the peak current of the at least one semiconductor.

18. A combined detection and sensing circuit as set forth in claim 15, including means connecting said output current sensing signal to the converter control circuit to control the output of the converter circuit.

19. A combined detection and sensing circuit as set forth in claim 15, wherein said integrating means includes resistive and capacitive means.

20. A combined detection and sensing circuit as set forth in claim 15, wherein said integrating means includes a capacitor charged by said sampling means through a resistance, and the voltage across said capacitor being said sensing signal.

* * * * *